US009096020B2

(12) United States Patent
Lazzara et al.

(10) Patent No.: US 9,096,020 B2
(45) Date of Patent: Aug. 4, 2015

(54) SYSTEMS, METHODS AND DEVICES FOR STRENGTHENING FLUID SYSTEM COMPONENTS USING RADIATION-CURABLE COMPOSITES

(75) Inventors: Christopher J. Lazzara, Palm Beach Shores, FL (US); Jozef Bicerano, Midland, MI (US)

(73) Assignee: Neptune Research, Inc., Riviera Beach, FL (US)

( * ) Notice: Subject to any disclaimer, the term of this patent is extended or adjusted under 35 U.S.C. 154(b) by 105 days.

(21) Appl. No.: 13/820,806

(22) PCT Filed: Sep. 21, 2011

(86) PCT No.: PCT/US2011/052472
§ 371 (c)(1),
(2), (4) Date: Mar. 5, 2013

(87) PCT Pub. No.: WO2012/040276
PCT Pub. Date: Mar. 29, 2012

(65) Prior Publication Data
US 2013/0160926 A1  Jun. 27, 2013

Related U.S. Application Data

(60) Provisional application No. 61/386,065, filed on Sep. 24, 2010.

(51) Int. Cl.
*B29C 73/04* (2006.01)
*B29C 70/30* (2006.01)
(Continued)

(52) U.S. Cl.
CPC .............. *B29C 70/30* (2013.01); *B29C 73/04* (2013.01); *B29C 73/10* (2013.01); *F16L 1/00* (2013.01);
(Continued)

(58) Field of Classification Search
CPC ........ B29C 73/04; B29C 73/10; B29C 70/30; B29C 2035/0827; B29C 2035/085; B29C 2035/0855; B29C 2035/0877; B29C 2035/0844; F16L 55/1683; F16L 55/16; F16L 1/00
USPC .................................. 156/95, 272.2, 350, 378
See application file for complete search history.

(56) References Cited

U.S. PATENT DOCUMENTS
3,770,556 A   11/1973   Evans et al.
4,200,676 A   4/1980   Caponigro et al.
(Continued)

FOREIGN PATENT DOCUMENTS
CN   101289607   10/2008
EP   0309597    4/1989
(Continued)

OTHER PUBLICATIONS
STOPAQ®FN 4100, Product Data Sheet; Dated Apr. 2008, (2 pages).
(Continued)

*Primary Examiner* — Daniel McNally
(74) *Attorney, Agent, or Firm* — Nixon Peabody LLP

(57) ABSTRACT

Methods are provided for strengthening (e.g., repairing, structurally reinforcing, etc.) a fluid-system component by installing, as a circumferential wrap or a patch, a radiation-curable composite laminate. Kits including composite repair materials and equipment for implementing the methods are also provided. Examples of fluid-system components that may be strengthened include pipework, pipelines, transmission pipelines, distribution pipelines, gathering lines, oil risers, gas risers, process piping, girth welds on pipelines or vessels, tanks, vessels, elbows, tees, flanges, and high-pressure injection lines. An approach where, prior to curing, the precursor to the composite laminate comprises a glass fabric, a carbon fabric, or any combination(s) thereof, pre-impregnated with an uncured epoxy resin, an uncured epoxy acrylate resin, or a mixture thereof, is used; curing is performed via electron beam irradiation; and the installation and curing procedures can be automated to the maximum extent possible, in exemplary embodiments of the present disclosure.

21 Claims, 3 Drawing Sheets

(51) Int. Cl.
*F16L 55/16* (2006.01)
*F16L 1/00* (2006.01)
*B29C 73/10* (2006.01)
*F16L 55/168* (2006.01)
*B29C 35/08* (2006.01)

(52) U.S. Cl.
CPC ............. *F16L 55/16* (2013.01); *F16L 55/1683* (2013.01); *B29C 2035/085* (2013.01); *B29C 2035/0827* (2013.01); *B29C 2035/0844* (2013.01); *B29C 2035/0855* (2013.01); *B29C 2035/0877* (2013.01)

(56) References Cited

U.S. PATENT DOCUMENTS

| | | | |
|---|---|---|---|
| 4,472,468 | A | 9/1984 | Tailor et al. |
| 4,519,856 | A | 5/1985 | Lazzara |
| 4,731,273 | A | 3/1988 | Bonk et al. |
| 4,732,632 | A | 3/1988 | Pieslak et al. |
| 4,803,104 | A | 2/1989 | Peigneur et al. |
| 4,961,978 | A | 10/1990 | Doheny, Jr. et al. |
| 5,030,493 | A | 7/1991 | Rich |
| 5,134,000 | A | 7/1992 | Smythe et al. |
| 5,175,032 | A | 12/1992 | Steele et al. |
| 5,302,428 | A | 4/1994 | Steele et al. |
| 5,411,777 | A | 5/1995 | Steele et al. |
| 5,732,743 | A * | 3/1998 | Livesay .......................... 138/99 |
| 6,235,148 | B1 * | 5/2001 | Courson et al. ............ 156/379.6 |
| 6,276,401 | B1 | 8/2001 | Wilson |
| 6,451,152 | B1 * | 9/2002 | Holmes et al. ............. 156/272.8 |
| 2007/0036982 | A1 * | 2/2007 | Perez et al. ................... 428/416 |
| 2007/0125437 | A1 | 6/2007 | Lazzara |
| 2010/0078118 | A1 | 4/2010 | Ehsani |

FOREIGN PATENT DOCUMENTS

| | | |
|---|---|---|
| FR | 1529246 | 5/1968 |
| GB | 870165 | 6/1961 |
| GB | 1078559 | 8/1967 |
| JP | 5087123 | 4/1993 |
| KR | 2002-0003422 | 1/2002 |
| RU | 2343339 | 1/2009 |
| WO | 90/12235 | 10/1990 |

OTHER PUBLICATIONS

PipeLine Technology: Non-Metallic Composite Repair Systems for Pipes and Pipelines; Jan. 2010; (5 pages).
International Search Authority Written Opinion, PCT/US11/52472, 6 pages, Feb. 7, 2012.
International Search Report, PCT/US11/52472, 2 pages, Feb. 7, 2012.
Alexander N. Bykanov et al; Automated Tape Placement with In-Situ Electron Beam Cure: Process Parameters Optimization. International Sampe Symposium and Exhibition, vol.—No. 47/1. 2002, 17 pages.
Bo Povloski; Deepwater pipeline Repair Lessons Learned and New Advances, Oil States Industries, Inc., Feb. 2008, 17 pages.
Daniel L. Goodman, Curing and Bonding of Composites Using Electron Beam Processing, publication Handbook of Polymer Blends and Composites, vol. 1, 2002., 41 pages.
Dr. Chris Alexander, Stress Engineering Services, Inc., Composite Repair Focus Series, Repairing mechanically damaged pipelines, www.pipelineandgastechnology.com Aug. 2009, 6 pages.
J. N. Hay and P. O'Gara, Recent developments in thermoset curing methods, Chemistry Division, Unis Materials Institute, University of Surrey, Surrey, UK, publication Jan. 6, 2006, 9 pages.
Ronald E. Allred et al; Light-Curing Structural Tape for In-Space Repair, Adherent Technologies, Inc. Published by Society for the Advancement of Material and Process Engineering with permission. copyright 2007, 15 pages.

* cited by examiner

SYSTEMS, METHODS AND DEVICES FOR STRENGTHENING FLUID SYSTEM COMPONENTS USING RADIATION-CURABLE COMPOSITES

CLAIM OF PRIORITY AND CROSS-REFERENCE TO RELATED APPLICATIONS

This application is a U.S. National Phase of International Application No. PCT/US2011/052472, filed on Sep. 21, 2011, which claims the benefit of and priority to U.S. Provisional Patent Application No. 61/386,065, filed on Sep. 24, 2010, the contents of both of which are incorporated herein by reference in their entireties.

TECHNICAL FIELD

The present disclosure relates generally to pipes, pipeline assemblies, and fluid systems. More particularly, this disclosure relates to systems, methods and devices for strengthening fluid system components using radiation-curable composites.

BACKGROUND

Fluid conduit assemblies, such as pipelines and hydraulic circuits, are used to transport an assortment of fluids, such as water, oil, various natural and synthetic gases, sewage, slurry, hazardous materials, and the like. Similar structures are utilized for transmitting electrical and fiber optic cabling across vast expanses of land in establishing telecommunication networks. The most commonly used conventional methods for repairing damaged fluid system components, such as carrier pipes, include the replacement of the component or the welding of a repair sleeve over the damaged section of the component. Such conventional remediation methods generally requires a costly interruption in system operation until the repair is completed. Furthermore, repairs based on such conventional remediation methods generally requires the costly and difficult transportation and handling of heavy repair parts, such as steel replacement components or steel repair sleeves for the remediation of damage in a metal pipe.

It has been established over the last two decades that composite repair system using a composite laminate can often provide a reliable and cost-effective means for repairing a damaged fluid system component. The installation of a composite laminate can often be performed without needing to interrupt operation of a fluid system. Furthermore, the materials that need to be transported and handled in order to install a composite repair system are lighter and less cumbersome than conventional repair materials, reducing the cost of making a repair as compared with replacing a damaged metal component or installing a metal repair sleeve.

In general, there are four types of composite repair systems. In one type of composite repair system, precured plies of a composite material (such as a glass fabric or a carbon fabric in a cured thermoset polymer matrix) are "glued together" ply-by-ply by using an adhesive as they are wrapped around a fluid system component that is being repaired. A commercial example of this approach is provided by the Clock Spring™ Repair Composite Sleeve manufactured by Clock Spring Company, L.P., of Houston, Tex. Some disadvantages of this approach include the fact that precured plies are generally quite rigid so that repairs can be difficult (and sometimes impossible) to perform on fluid system components, especially those possessing complex shapes.

In another type of composite repair system, a dry fabric (such as a dry glass fabric or a dry carbon fabric) is wrapped around the fluid system component that is being repaired. The fabric is then impregnated with an uncured resin, and the resin is cured. A commercial example of this approach is provided by the Carbon-Ply Composite Repair System manufactured by Crosslink Composites LLC of Wellsboro, Pa. One primary disadvantage of this approach is that the wetting of a wrapped (and hence multilayer) dry fabric in the field can incur the risk of poor final cured composite quality as a result of a possible undetected failure of an uncured resin formulation, especially if it does not possess an extremely low viscosity necessary to completely "soak through" the multiple layers of the dry fabric as required for proper impregnation. Installations made by using this approach are, hence, especially susceptible to quality variations related to field technician performance.

In another type of composite repair system, an uncured resin formulation is applied to a layer of a dry fabric before wrapping this layer of fabric (now in a wetted form) around a fluid system component. There are some inherent risks related to field technician performance during the impregnation of the fabric since the technician must start with a layer of dry fabric and impregnate it in the field before wrapping it around the fluid system component. This approach is used in many composite repair systems comprising two-part (resin and hardener) epoxy resin formulations. Many such formulations cure thermally at moderate temperatures once the two parts are mixed. Consequently, the two parts must remain unmixed until the product is ready to be installed in order to prevent premature curing. A commercial example is provided by the RES-Q™ Composite Wrap manufactured by T. D. Williamson, Inc of Tulsa, Okla.

In another type of composite repair system, a fabric (such as a glass fabric or a carbon fabric) is pre-impregnated in a manufacturing facility with an uncured resin. The resulting "wet" fabric (pre-impregnated with uncured resin) is packaged and transported to a repair site in a manner that protects it from premature curing. The wet fabric is subsequently removed from its packaging, wrapped around the fluid system component that is being repaired, and the resin is cured. When using a resin formulation that can be protected reliably from premature curing, this approach is preferable because it eliminates many quality risks associated with impregnating the fabric with an uncured resin in the field by performing the impregnation under controllable conditions in a factory. Two commercial examples are provided by Syntho-Glass™ XT and Viper-Skin™, manufactured by Neptune Research, Inc. of Lake Park, Fla., both of which use a moisture-curable polyurethane resin formulation. A bidirectional glass fabric is used in Syntho-Glass™ XT, while a hybrid bidirectional fabric woven by using a carbon fiber in one direction and a glass fiber in the other direction is used in Viper-Skin™.

Existing composite laminate materials targeted for use in repairing fluid system components are currently limited by the availability of only thermal curing, moisture-activated curing, and moisture-activated curing with thermal postcuring methods for obtaining a load-bearing composite laminate. These composite materials, however, are impractical in certain applications. For instance, proper installation of a moisture-cured or thermally-cured composite repair system may not be feasible in sub-zero environments, such as repairing sections of the Trans-Alaska Pipeline during the winter months. In another non-limiting example, the mileage of installed deepwater pipelines continues to grow rapidly. It is very cumbersome, as well as expensive, to perform deepwater pipeline repairs based on conventional repair approaches, some of which include installing clamps and/or connectors, replacing damaged pipe sections, and, if necessary, lifting a damaged pipe section to the surface rather than repairing it in the deepwater environment. Some related background information is provided by B. Povlovski, in "Deepwater Pipeline Repair—Lessons Learned and New Advances", Proceedings of the 20th Deep Offshore Technology [DOT] International Conference, Houston, Tex., Feb. 12-14, 2008, which is hereby incorporated by reference herein in its entirety.

Composite laminates have not yet made many inroads into deepwater pipeline repairs, mainly because of aspects related to how the composite laminates are cured. Many thermally-curing composite laminates require threshold curing temperatures to obtain an acceptable level of cure at an acceptable rate. These threshold temperatures are oftentimes costly and difficult or otherwise impossible to achieve in deepwater environments and/or subzero temperatures. On the other hand, the use of a moisture-activated curing composite laminate in a deepwater environment is often hampered by its inherent tendency to cure prematurely upon exposure to the water in which a deepwater pipeline is submerged. The opportunity to expand the range of applications of composite laminates to include deepwater and cold pipeline repairs is just some of the many possible examples of why there is ongoing development of new methodologies for the repair of fluid system components by using composite laminate compositions that do not rely on thermal or moisture-activated curing as their primary curing mechanism.

SUMMARY

According to one aspect of the present disclosure, a method is provided for strengthening (i.e., repairing, structurally reinforcing, or combinations thereof) a fluid system component by installing, externally to it, as a circumferential wrap or as a patch, a radiation-curable composite laminate. In this context, a "radiation-curable" composite laminate may be defined as a composite laminate where chemical reactions induced directly by the radiation play an important role in the curing process. As a non-limiting comparison, some uncured composite laminates are placed under direct sunlight to increase its temperature. A composite laminate that is cured primarily by thermal curing reactions that could have been obtained by heating it to the same temperature by some other means (e.g., placing it in an oven) is not considered to be "radiation-curable" since sunlight has merely provided a means for heating it so that thermal curing can take place. On the other hand, if the ultraviolet component of sunlight interacts with the uncured composite laminate and induces photochemical reactions that provide a primary mechanism for curing, then it is considered to be "radiation-curable".

Non-limiting examples of fluid system components that may be strengthened include pipework, pipelines, transmission pipelines, distribution pipelines, gathering lines, oil risers, gas risers, process piping (for chemicals, oil, gases, water, or steam), girth welds on pipelines, tanks, vessels, girth welds on vessels, elbows, tees, flanges, and high-pressure injection lines. In an exemplary embodiment, prior to curing, the precursor to the composite laminate comprises a glass fabric, a carbon fabric, or combinations thereof, that is pre-impregnated with an uncured epoxy resin, an uncured epoxy acrylate resin, or any mixtures thereof. Curing is performed via electron beam irradiation. The installation and curing procedures can be automated to the maximum extent possible, in various exemplary embodiments. Repair kits including composite repair materials and equipment for implementing the method are also provided.

The American Society of Mechanical Engineers (ASME) published "Repair of Pressure Equipment and Piping," Part 4 (Non-Metallic and Bonded Repairs), Article 4.1, "Non-Metallic Composite Repair Systems: High Risk Applications," (2006), which is hereby incorporated by reference herein in its entirety. This standard defines a circumferentially wrapped composite repair system and its components, describes tests to qualify such a composite repair system, provides computational methods for designing optimum composite repair systems for specific classes of repair situations, and provides general guidelines for system installation and installer qualification. To date, there are no legal or regulatory requirements for a manufacturer to qualify a composite repair system based on Article 4.1. Nevertheless, it may be desirable to voluntarily subject new composite repair products to the testing required for qualification under this standard.

Article 4.1 provides criteria for the qualification of a composite repair system in making repairs for (a) external and/or internal wall losses that often occur in fluid system components as a result of corrosion, and (b) leaks of fluid system components. There is, however, ongoing research to define the best practices for the safe and reliable use of composite repair systems for the repair of additional types of damage; such as but not limited to dents, gouges, and combinations thereof. For example, Dr. Chris Alexander describes some of the ongoing research in "Repairing Mechanically-Damaged Pipelines," PipeLine and Gas Tech., Vol. 8, No. 7, pages 52-57, August 2009, which is hereby incorporated by reference herein in its entirety.

It may be both impractical and unnecessary to wrap a composite laminate around the entire circumference of a fluid system component possessing a large diameter and/or inordinate geometry. It is often more practical in terms of ease of installation, less wasteful of materials and labor, and sufficient from the point of view of achieving safe and reliable remediation, to place a composite laminate in the form of a patch on a damaged region rather than wrapping an elongated laminate around the entire perimeter of such components. Heretofore, work had been started by an ASME committee to develop qualification standards for repairs using composite laminates as patches.

A method, comprising an external installation of a radiation-curable composite laminate as a circumferential wrap or as a patch, is taught for strengthening a fluid system component. The term "strengthening," as used in this disclosure, is inclusive of, inter alia, a repair made as a remedial action on a damaged fluid system component, a structural reinforcement made to enhance an undamaged fluid system component, or any combination thereof. Fluid system components that may be strengthened are constructed from materials such as, but not limited to, carbon steel, low and high alloy steel, stainless steel, aluminum, titanium, polyethylene, polyvinyl chloride (PVC), acrylonitrile-butadiene-styrene (ABS) copolymers, fiber-reinforced polymers, or concrete, or any combination thereof.

In one aspect, a method of the present disclosure comprises: transporting near the location of the fluid system component a fabric constructed from a continuous reinforcing fiber, wherein the fabric is pre-impregnated with a reactive precursor; unrolling the fabric and wrapping it around the fluid system component; and applying radiation to cure the reactive precursor to obtain a load-bearing composite laminate comprising the fabric in a thermoset polymer matrix.

In another aspect, the method of the present disclosure comprises: transporting near the location of the fluid system component a fabric constructed from a continuous reinforcing fiber, wherein the fabric is pre-impregnated with a reactive precursor; unrolling the fabric and placing it as a patch over a portion of the fluid system component; and applying radiation to cure the reactive precursor to obtain a load-bearing composite laminate comprising the fabric in a thermoset polymer matrix.

It is also contemplated that in certain embodiment, kits for implementing the methods and systems, such as those descried elsewhere herein, may be provided. The kits can include, among other things, composite repair materials and/or equipment for implementing such methods and/or processes.

Another aspect of the present disclosure is directed to a method for strengthening a component in a fluid system. The method includes: providing a composite laminate with a fabric carrier including a continuous reinforcing fiber, the fabric carrier being pre-impregnated with a reactive precursor chemically configured to activate upon exposure to artificial radiation; placing the composite laminate over a portion of the fluid-system component; and applying artificial radiation to the fabric carrier such that the reactive precursor is cured thereby creating a load-bearing repair implement from the composite laminate According to yet another aspect, a repair kit is presented for strengthening a component in a fluid system. The repair kit includes a composite laminate with a fabric carrier having a continuous reinforcing fiber. The fabric carrier is pre-impregnated with a reactive precursor that is chemically configured to activate upon exposure to artificial radiation. The repair kit also includes a radiation device operable to apply artificial radiation to the composite laminate at sufficient intensity to thereby activate the reactive precursor. Applying radiation to the fabric carrier such that the reactive precursor is cured creates a load-bearing repair implement from the composite laminate.

Also presented herein is a composite laminate for repairing a section of a pipeline assembly. The composite laminate includes a fabric carrier including a continuous reinforcing fiber. The fabric carrier is pre-impregnated with a reactive precursor that is chemically configured to activate and harden upon exposure to radiation but not water. In some embodiments, the reactive precursor is chemically configured to activate in water depths of approximately 1 to 20,000 feet, water temperatures of approximately $-15°$ C. and higher, or both. In other embodiments, the reactive precursor is chemically configured to activate in water depths of approximately 5 to 10,000 feet (1.5 to 3,048 meters), temperatures of approximately $-18$ to $24°$ C. (0 to $75°$ F.), or both. Activating the reactive precursor creates a load-bearing repair implement from the composite laminate. The load-bearing repair implement exhibits a tensile strength of approximately 103.4 to 1034.2 megapascal (MPa) (15,000 to 150,000 pounds per square inch (psi)) (e.g., in at least one principal axis direction) and an impact resistance of at least approximately 80 joules. In some embodiments, the load-bearing repair implement exhibits an impact resistance of approximately 80 to 300 joules and, in some embodiments, approximately 200 to 600 joules. In other embodiments, the load-bearing implement formed from the composite laminate exhibits a tensile strength of at least approximately 86.2 MPa (12,500 psi) in at least one principal axis direction. In other embodiments, the load-bearing implement formed from the composite laminate exhibits a tensile strength of at least 15,000 psi (103.4 MPa) in both principal axis directions. In yet some other embodiments, the load-bearing implement formed from the composite laminate exhibits a tensile strength of at least 30,000 pounds per square inch (206.8 MPa) in at least one principal axis direction.

The above summary is not intended to represent each embodiment, or every aspect, of the present disclosure. Rather, additional aspects of the disclosure will be apparent to those of ordinary skill in the art in view of the detailed description of various embodiments, which is made with reference to the drawings, a brief description of which is provided below

Figure 1:
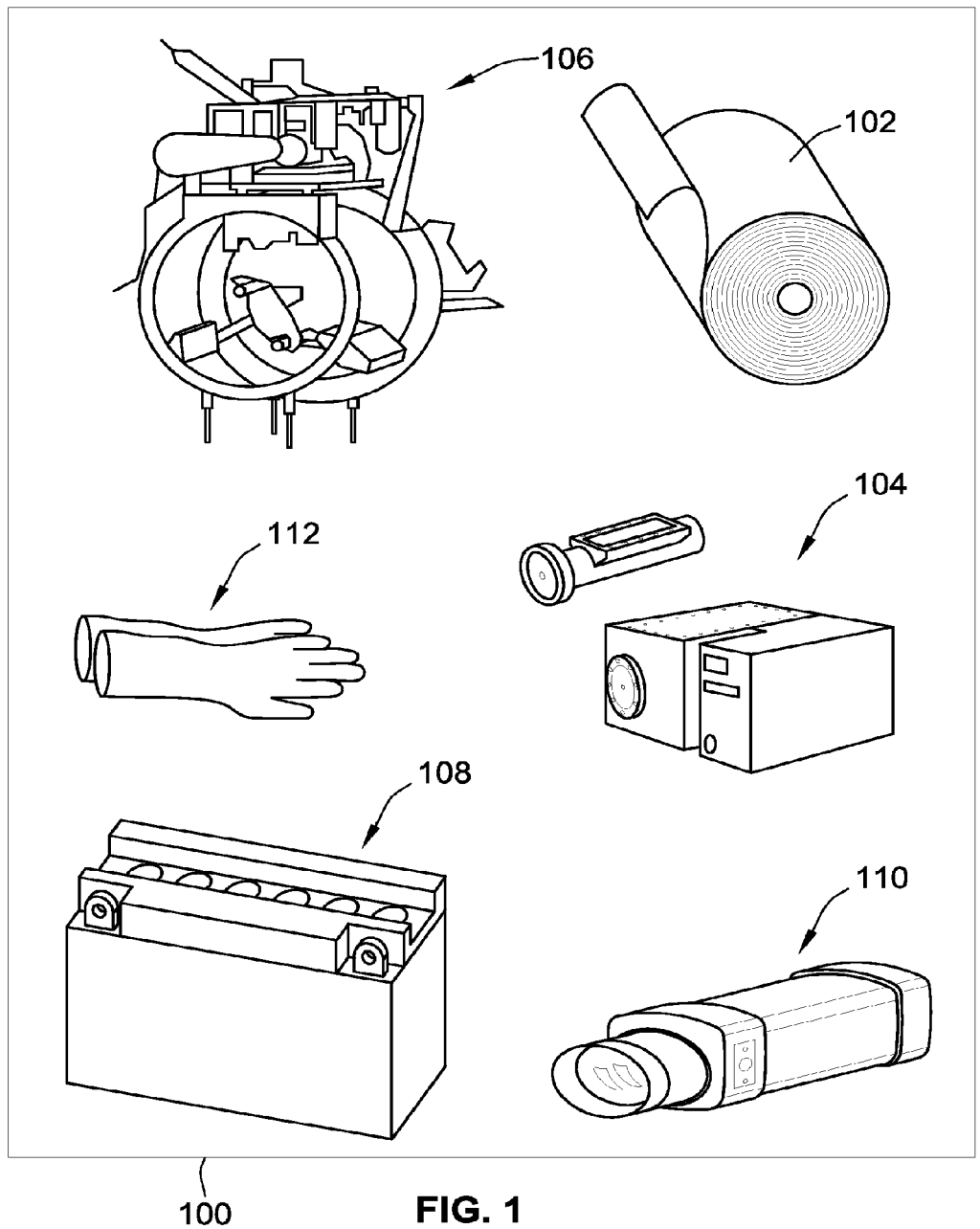
FIG. 1 is a perspective-view illustration of a representative repair kit for strengthening fluid-system components in accordance with aspects of the present disclosure.

While this disclosure is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the disclosure.

DESCRIPTION OF EXEMPLARY EMBODIMENTS

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims. To that extent, elements and limitations that are disclosed herein, for example, in the Abstract, Summary, and Detailed Description sections, but not explicitly set forth in the claims, should not be incorporated into the claims, singly or collectively, by implication, inference or otherwise.

Figure 2:
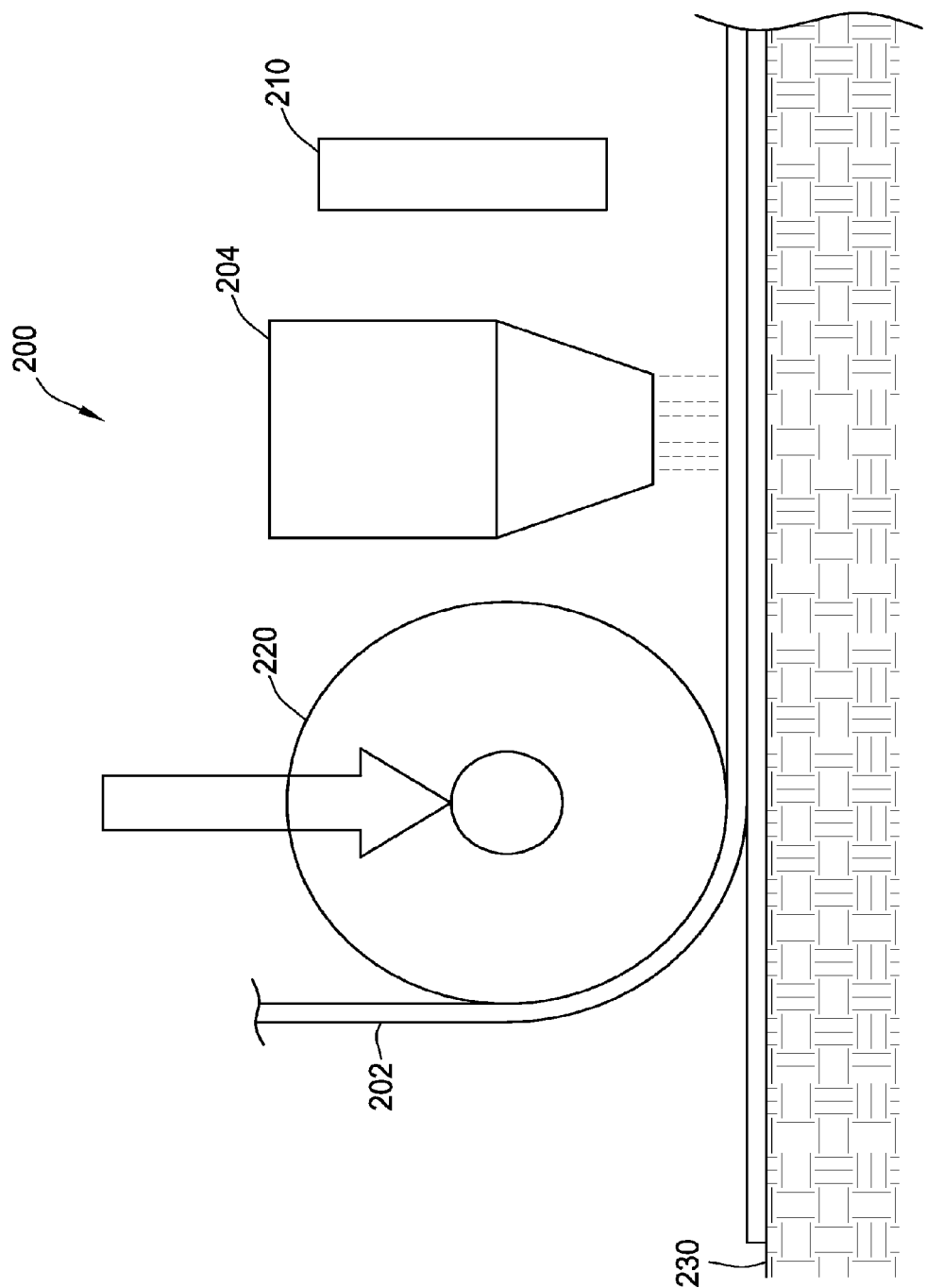
FIG. 2 is a perspective-view illustration of a representative repair system for strengthening an exemplary fluid-system component in accordance with aspects of the present disclosure.
Figure 3:
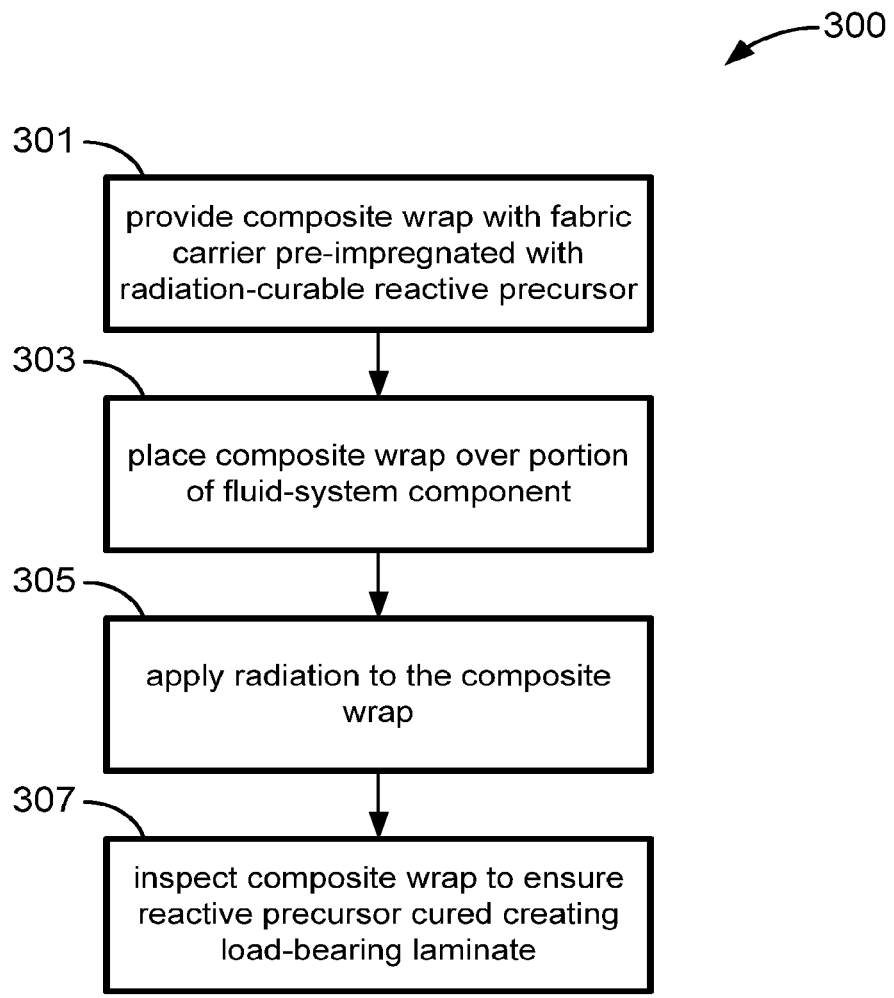
FIG. 3 is a flow chart diagrammatically illustrating a representative method of strengthening fluid-system components in accordance with aspects of the present disclosure.

Referring now to the drawings, wherein like reference numbers refer to like components throughout the several views, FIG. 1 illustrates an exemplary repair kit, designated 100, for strengthening fluid-system components, FIG. 2 illustrates a representative repair system, indicated generally at 200, strengthening a fluid-system component, and FIG. 3 illustrates a representative method 300 of strengthening fluid-system components. The drawings presented herein are provided purely for instructional purposes, and should therefore not be considered limiting. By way of example, some of the description set forth herein may be made with reference to the repair of a damaged pipe in a transmission pipeline assembly intended for transporting any of an assortment of fluids, such as water, oil, natural and synthetic gases, sewage, slurry, hazardous materials, etc. However, the present invention may be utilized in other pipeline assemblies, such as those housing fiber optic wires, electrical cabling, etc, and other components. In addition, the drawings presented herein are not to scale; thus, the individual and relative dimensions shown in the drawings are not to be considered limiting.

The repair kit 100, as exemplified in FIG. 1, is inclusive of, but not exclusive to, a composite laminate 102, a radiation device 104, an automated wrapping device 106, a power supply 108, an optical measuring tool 110, and safety gloves 112. Additional and/or alternative components can be included in the repair kit 100 without deviating from the intended scope of the present disclosure. As will be developed further below, the composite laminate 102 includes a fabric carrier fabricated, at least in part, from a continuous reinforcing fiber. The fabric carrier is pre-impregnated with a reactive precursor chemically configured to activate upon exposure to artificial radiation. As used herein, "pre-impregnated" can mean impregnated prior to the commencement of the installation at the repair site. As some non-limiting examples, the fabric carrier may be impregnated during fabrication at a manufacturing plant, it may be impregnated after it leaves the manufacturing plant but prior to transportation to the repair site, it may be impregnated during transportation to the repair site, and/or it may be impregnated at the repair site but prior to the commencement of the installation process. In this vein, the composite laminate 102 of FIG. 1 can take on any of the applicable forms and alternative configurations, and include any of the various optional features described herein with respect to composite laminates of the present invention. Although shown as an elongated flexible wrap wound into a roll, alternative arrangements can include a composite laminate 102 in the form of a patch, a number of patches, a frangible wrap separable into smaller sections, and/or means for partitioning an elongated wrap into smaller sections.

The repair kit 100 of FIG. 1 also includes a radiation device 104 that is operable to apply artificial radiation to the composite laminate at sufficient intensity to thereby activate the reactive precursor. Applying radiation to the fabric carrier in this manner activates and cures the reactive precursor, which operates to create a load-bearing repair implement from the composite laminate. The applied radiation may be in the form of microwaves, ultraviolet rays, electron beams, x-rays, or gamma-rays, or any combination thereof. As will be developed in further detail below, the radiation device 104 may be configured to generate an electron beam that, in some embodiments, possesses an energy ranging from approximately 0.15-0.3 megaelectron volts (MeV). The radiation device 104 may be in the form of a COMET™ EBA-90, EBA-180 EBA-200 E-beam emitter, available from COMET Technologies USA, Inc., of Stamford, Conn. Such electron beam emitters are of the water-cooled, hermetically sealed metal ceramic vacuum tube type. Options for the radiation device 104 can include an active window length of approximately 270-400 mm, a voltage range of approximately 70-200 kV, and a power range of approximately 2 to 4 kW.

Also included in the repair kit 100 are an automated wrapping device 106 and a power supply 108 for powering the radiation device 104, the wrapping device 106, or both depending upon individual requirements. The automated wrapping device 106 may be in the form of an Eagle Powered Rap-Rite Wrapping machine, available from Eagle Manufacturing and Field Services, Inc., of Tulsa, Okla. In this instance, the wrapping device 106 can be pneumatically or hydraulically powered, powered by a gasoline or diesel engine, or powered via an electric motor, which in turn can draw electricity from the power supply 108 which is represented herein for illustrative purposes by a battery module. Alternative power supplies, such as a gas-powered generator, are also within the scope of the present concepts. The wrapping device 106 can be provided with various optional features, including an optional adjustable overlap control for changing the width of overlap, preceding and trailing tape arms, a constant-tension tape brake, a release-liner take-up mechanism, an adjustable break-open frame, and the option to apply inner-wrap and outer-wrap in a single pass. In some embodiments it may be desirable that the automated wrapping device 106 include wheels or other mechanical means for mounting the device 106 on a pipe, a loadable arm to create tension on and hold a roll of composite laminate 102, and a pressure wheel or blade to press layers of composite onto themselves.

The protective safety gloves 112 are adapted to be worn by a user in the handling, preparation, and/or application of any materials that may irritate the skin, which may be the case of a flexible fiberglass composite wrap 102. The protective gloves 112 are preferably composed of latex, but can be composed of any material that enables the protective gloves 112 to be used for their intended purpose. An optical measuring tool 110 (or "inspection eye") can also be provided as a means for checking to ensure that the composite laminate 102 has properly cured after exposure to radiation. The optical measuring tool 110 can be in the form of a spectrophotometer or other colorimetric device, many variations of which are available from Thermo Fisher Scientific, Inc., and Ocean Optics, Inc.

Turning next to FIG. 2, wherein similar reference numerals designate the same or similar components from FIG. 1, a repair system 200 for strengthening a fluid-system component, such as a transmission pipe 230, is shown in accordance with aspects of the present disclosure. The repair system 200, as exemplified in FIG. 2, includes a composite laminate 202, a radiation device 204 for activating and curing the composite laminate 202, an optical measuring tool 210 for confirming the composite laminate 202 has properly cured, and a pressure roller 220 for applying pressure to the composite laminate 202 during the installation process. Each of the foregoing may be similar in structure and operation to its corresponding component from FIG. 1 or those described below with respect to the other aspects and embodiments of the present disclosure.

The roller 220, which may be part of or wholly separate from the automated wrapping device 106 of FIG. 1, assists in applying the pre-impregnated composite laminate 202 to the outer surface of a pipe 230 or other component of the fluid system. As seen in FIG. 2, radiation device 204, which may be in the form of an electron-beam gun, is located downstream from the pressure roller 204—i.e., at a location along the composite laminate 202 after the laminate 202 is positioned against the pipe 230 and after pressure is applied to the laminate 202 by the roller 220. The pressure roller 204 operates to press the composite laminate 202 onto one or more underlying layers of composite laminate 202, for example, to assist in removing entrained air and/or water. Artificial radiation is thereafter applied to the composite laminate 202 via the radiation device 204 to activate and cure the reactive, pre-impregnated precursor. As a quality measure, the optical measuring tool 210 operates to check the resulting repair implement for proper cure, defects, and/or other metrics of quality. In some embodiments, a pigment-changing agent may be integrated into the resin with which the fabric carrier of the composite laminate 202 is impregnated such that the optical sensor 210 can more easily detect whether the is laminate 202 fully and properly cured as the resin will change in color from before to after it has been exposed to radiation. The repair system 200 may also include a blade to press down on and/or apply tension to the composite laminate 202, and perhaps a second radiation device or a supplemental thermal curing device to cure the composite laminate 202 a second time.

The reactive precursor in the composite laminate 202 of FIG. 2 is chemically configured to activate and harden upon exposure to artificial radiation. In some embodiments, reactive agent in the composite laminate 202 is generally hydrophobic—i.e., tends not to combine with and react to water, saline or other water-based solutions. In some embodiments, the reactive precursor is designed to activate in deep-water applications—e.g., water depths of approximately 5-10,000 feet (1.5-3,048 meters), cold-zone applications—e.g., temperatures of approximately −18-24° C. (0-75° F.), or both. In some embodiments, the reactive precursor is chemically configured to activate in water depths of approximately 1-20,000 feet, water temperatures of approximately −15° C. and higher, or both. Activating the reactive precursor creates a load-bearing repair implement, which may be represented herein by the two-layer cured portion of the composite 230 to the right of the pressure roller 220 in FIG. 2. The load-bearing repair implement, in some embodiments, exhibits a tensile strength of approximately 103.42 to 1034.21 MPa (15,000 to 150,000 psi) (e.g., in at least one principal axis direction) and an impact resistance of at least approximately 80 joules and, in some embodiments, approximately 80-300 joules and, in some embodiments, approximately 200-600 joules. In other embodiments, the load-bearing implement formed from the composite laminate exhibits a tensile strength of at least approximately 86.2 megapascal (MPa) (12,500 psi) in at least one principal axis direction. In other embodiments, the load-bearing implement formed from the composite laminate exhibits a tensile strength of at least 103.4 MPa (15,000 psi) in both principal axis directions. In yet some other embodiments, the load-bearing implement formed from the composite laminate exhibits a tensile strength of at least 206.8 MPa (30,000 psi) in at least one principal axis direction. In yet some other embodiments, the load-bearing implement formed from the composite laminate exhibits a tensile strength of at least 344.7 MPa (50,000 psi) in at least one principal axis direction.

The flowchart of FIG. 3 diagrammatically illustrates an improved method 300 for strengthening a component in a fluid system. In some specific embodiments, the flow chart of FIG. 3 can be considered representative of a method for repairing a damaged transmission pipe in a pipeline assembly. The method or algorithm 300 of FIG. 3 is described herein with respect to the embodiments illustrated in FIGS. 1 and 2. However, the claimed methods are not so limited. For example, the methods presented herein are not per se limited to particular components of the repair kit 100 of FIG. 1 or the particular pipeline assembly 230 of FIG. 2. Likewise, use of the word "step" or "act" in the specification or claims is not intended to be limiting and should not be considered as limiting.

The method 300 of FIG. 3 comprises four generalized steps, which will be developed further in the description that follows. These steps include: block 301: providing a composite wrap with a fabric carrier pre-impregnated with a radiation-curable reactive precursor; block 303: placing the composite wrap over a portion of a fluid-system component; block 305: applying artificial radiation to the composite wrap to activate and cure the wrap into load-bearing repair implement; and block 307: inspecting the composite wrap to ensure the reactive precursor properly cured. In some embodiments, the method 300 includes at least those steps enumerated in FIG. 3. It is also within the scope and spirit of the present invention to omit steps, include additional steps, and/or modify the order presented. It should be further noted that the method 300 represents a single sequence of creating a single repair implement. Nevertheless, it is expected that the method 300 be practiced in a systematic and repetitive manner.

The composite laminates used in some implementations of the present disclosure comprise a thermoset polymer matrix and a fabric constructed from a continuous reinforcing fiber. Any reactive precursor that can be cured into a thermoset polymer matrix may be used, including, but not limited to, an epoxy, an epoxy acrylate, an imide, a bismaleimide, an acrylate, a urethane, a urethane acrylate, a urea, an unsaturated ester, a vinyl ester, a cyanate ester, a phenolic, or a mixture thereof; formulated to be susceptible to curing upon applying radiation.

Other desired attributes of the reactive precursor depend, for example, on the application environment. As a non-limiting example, for a broad range of underwater steel pipeline repair applications, a desirable reactive precursor can be (a) resistant to the activation of its cure by water; (b) insoluble in water; (c) radiation-curable at temperatures as low as −10° C. (14° F.); and (d) once in its cured form, capable of providing the resulting load-bearing composite laminate with good adhesion to steel underwater as measured by a lap shear strength of at least approximately 4 MPa (580 psi). Optionally, the reactive precursor can be chemically configured to activate in a water pressure of approximately 0.015 to 30.34 MPa (2.2 to 4,400 psi).

Some non-limiting examples of the types of reactive precursors that may be used include those described in the following (all of which are hereby incorporated by reference herein in their respective entireties): (a) J. N. Hay and P. O'Gara, "Recent Developments in Thermoset Curing Methods", Proc. ImechE Vol. 220 Part G: J. Aerospace Engineering, pages 187-195, 2006; (b) Cytec Industries Inc. of Woodland Park, N.J. sells several product lines of resins and specialty additives for use in ultraviolet and/or electron beam curing formulations, such as EBECRYL™ resins and oligomers, UCECOAT™ waterborne resins, RAYLOK™ resins, and ADDITOL™ photoinitiators and additives; EBECRYL™ 3701 (a modified bisphenol-A epoxy diacrylate) and EBECRYL™ 8808 (an aliphatic urethane diacrylate) are two specific, non-limiting examples of Cytec's commercially available radiation-curable formulations; and (c) the Sartomer Company of Exton, Pa., sells many ultraviolet and/or electron beam curing formulations, including, as some specific non-limiting examples, CN112C60 (a trifunctional epoxy novolacacrylate blended with 40% SR351, trimethylolpropane triacrylate), CN117 (a modified epoxy acrylate), CN120 (an epoxy acrylate), and SR833S (a tricyclodecane dimethanol diacrylate). Additionally, Adherent Technologies, Inc. of Albuquerque, N. Mex., has developed formulations that can cure rapidly under irradiation even in space which is much colder than a deepwater environment. These formulations include hybrid resin systems that combine free radical and cationic curing mechanisms in a synergistic manner. Resins have also been formulated that will cure optimally at specific desired wavelengths (and hence at specific desired frequencies and energies) of irradiation. Furthermore, Adherent has also developed a special tape dispenser system, similar in concept to 35-mm photographic film canisters, as a simple dispensing system to minimize the risk of the accidental light exposure of a radiation-curable resin formulation. Some of this work is described by R. E. Allred, A. E. Hoyt Haight and T. F. Wesley, "Light-Curing Structural Tape for In-Space Repair", Proceedings of the 39th ISTC Conference, Cincinnati, Ohio, Oct. 29-Nov. 1, 2007, which is also incorporated by reference herein in its entirety.

A reactive precursor formulation may optionally comprise additional ingredients or additives, such as, but not limited to, an impact modifier, a fire retardant, an antioxidant, a photo-initiator, a catalyst, an inhibitor, a buffer, a dispersant, a surfactant, a stabilizer, a compatibilizer, a rheology modifier, a defoamer, or any combination(s) thereof.

Many types of continuous reinforcing fiber may be used for the fabric carrier of the composite laminate, including, but certainly not limited to, a glass fiber, a carbon fiber, a basalt fiber, an aramid fiber, a polyolefin fiber, any other type of synthetic polymer fiber, a fiber obtained or derived from a plant product, a fiber obtained or derived from an animal product, or any combination(s) thereof; arranged in a uniaxial orientation, a biaxial orientation, or any combination(s) thereof. Different plies of a composite laminate may contain the same type of fiber (such as carbon fibers) or different types of fibers (such as glass fibers in the ply bonded to the surface of the fluid system component and carbon fibers in the other plies). The fibers in different plies of a composite laminate may be oriented in the same manner or they may be oriented in different ways.

The implementation of certain embodiments of the present disclosure comprises a step of curing a reactive precursor by applying radiation, wherein the radiation may comprise, but is not limited to, microwaves, ultraviolet rays, an electron beam, x-rays, gamma-rays, or any combination(s) thereof.

The choice of which type or types of radiation to be used can depend on factors such as, but not limited to, the penetration depth of the radiation, as well as the availability, cost, safety, and ease of use of suitable equipment. The maximum attainable penetration depth increases as the energy of the radiation increases, being greatest with x-rays (up to approximately 12 inches) and least with ultraviolet rays (up to approximately 0.8 inches) among the alternatives of ultraviolet irradiation, electron beam irradiation, and x-ray irradiation. On the other hand, in general, the availability, cost, safety, and ease of use of suitable equipment increases as the energy of the radiation decreases, usually being greatest with ultraviolet rays and least with x-rays among the alternatives. In the case of curing by using ultraviolet radiation, the need for the optical transparency of the material that will be cured to allow penetration can imposes a challenge to the curing of a composite where carbon fibers, which lack optical transparency, have been used constructing in the reinforcing fabric. Electron beam curing (with a penetration depth of up to approximately 2 inches) often provides an optimum or desirable balance between these factors.

While the penetration depth is related mainly to the energy of the radiation, the curing rate (and hence the curing time) is controlled mainly by the dose rate (defined as the amount of radiation absorbed per unit time). The penetration depth and the curing rate are hence not in lockstep with each other. They can be varied independently to a significant extent to optimize a curing process. For example, at a fixed energy of radiation intended to achieve a desired penetration depth, the curing rate can be modified by selecting resin formulations comprising unreacted resins of differing molecular structure, photoinitiators of differing molecular structure, photoinitiators at differing concentrations, or any combination(s) thereof.

An advantage of using radiation-curable resin formulations in terms of storage, handling, and transport can include that, unlike a resin formulation intended to be cured thermally, there is no need for a radiation-curable resin formulation to be thermally labile. In addition, unlike a resin formulation intended to undergo moisture-activated curing, there is no need for a radiation-curable resin formulation to be labile in the presence of water. On the other hand, some radiation-curable resin formulations may begin curing if exposed to ultraviolet light, so that their exposure to sunlight may need to be minimized during storage, handling, and transport.

A processing advantage of radiation curing is that it can help achieve rapid curing even at very low temperatures, such as water temperatures as low as approximately $-10°$ C. ($14°$ F.), that may be encountered in some deep saltwater or cold environment applications because of the effect of the dissolved salt on the freezing temperature of water. By way of contrast, the energy-intensive nature of thermal curing (in other words, the fact that often a large amount of thermal energy must be provided to increase the temperature to the level that will enable the acceptably rapid cure of a typical thermally-curing resin) introduces practical difficulties that are very difficult to overcome in cold and/or water-submerged environment(s).

The performance of a thermally-cured composite is often limited by residual stresses introduced during "cool down" from a high temperature after cure as a result of mismatches of thermal expansion coefficients. For example, a thermal expansion coefficient difference between a thermoset polymer matrix and a fabric may create residual stresses within a composite laminate. In addition, a difference in thermal expansion coefficient between a composite laminate and a fluid system component onto which the laminate has been applied may create residual stresses between the composite laminate and the fluid system component. An advantage of a radiation-cured composite compared with a similar thermally-cured composite is the buildup of less residual stress since there is no need to cool down from a high temperature after cure.

A potential disadvantage of some radiation-cured composites compared with similar thermally-cured composites is that radiation curing sometimes results in poor fiber-matrix adhesion. Poor fiber-matrix adhesion may result in lower performance characteristics (such as a lower strength), especially in the weaker transverse direction of a composite laminate where the fiber orientation is not biaxially symmetric. Some approaches that may be used to overcome this challenge can include, singly and in any combination: careful optimization of the radiation curing process conditions; use of fibers that have been specially surface-modified to enhance their adhesion to the radiation-cured thermoset polymer matrix; and, use of a thermal postcure step to further the extent of cure by enhancing molecular mobility.

If it is desired that the extent of curing is to be driven further than can be achieved readily by means of radiation curing, a moderate thermal postcure can be applied and may be preferred to the use of a very high radiation dose rate and total dose to induce a very large exotherm. In this context, the "exotherm" refers to the thermal energy (heat) released as a result of the curing reactions that are taking place. Such an exotherm can be measured by using standard techniques of material testing, such as but not limited to differential scanning calorimetry. A very large exotherm, however, can induce an uncontrollable runaway reaction as it overheats the reacting system while inducing thermal cure simultaneously with the radiation cure. This can potentially lead to reduced and highly variable and hence unpredictable cured composite laminate properties. Consequently, a thermal postcure step can be useful to help achieve higher quality than non-postcure methods by obtaining full composite laminate material properties in a reliable manner. When a thermal postcuring step is used, it is typically sufficient to impose a heat exposure profile which allows for significantly lower temperatures and/or significantly shorter durations than would be required to achieve a similar extent of cure starting from a similar uncured resin formulation via thermal curing by itself. As a non-limiting illustrative example, a composite laminate that requires thermal curing at a temperature of $80°$ C. ($176°$ F.) for four hours to reach a Shore D hardness level of 75, if it has been first cured via radiation, may instead be able to reach the same Shore D hardness level of 75 after postcuring for just one hour at a temperature of 45° C. (113° F.) or after postcuring for just fifteen minutes at temperature of 60° C. (140° F.).

Field installations of certain embodiments may include equipment suitable for the safe and efficient installation and radiation-induced curing of a composite laminate. In one non-limiting example for deepwater repairs, completely automated (robotic) methods can be used for a "diverless" installation of a composite laminate by using equipment and supplies transported to the repair site via a remotely operated vehicle (ROV). In practical implementations of such methods, another possible role for an ROV (beyond its use in transporting equipment and supplies to a repair site) is its use for the installation and/or curing of a composite laminate. In any particular field installation, an ROV may be used for transporting equipment and supplies to the repair site, for installing a composite laminate, for the radiation-induced curing of the composite laminate, or any combination thereof.

In another example, for coastal or shallow water repairs, it is possible to choose between using completely automated or semi-automated methods, deploying personnel (for example, one or more divers) to a repair site to install an uncured composite laminate and then use portable radiation curing equipment to cure it, or using a partially automated, partially manual approach. In a similar regard, for above ground repairs, such as repairs at exceedingly cold locations, it is possible to choose between using completely automated methods, deploying personnel to the repair site to install an uncured composite laminate and use portable radiation curing equipment to cure it, or using a partially automated, partially manual approach.

The development of radiation-curable composite laminates that are easier to install than thermally-curing or moisture-activated curing composite laminates in many environments is anticipated to expand greatly the applications of composite repair systems in strengthening fluid system components. As a non-limiting example, in deepwater pipeline repair applications, the installation of a radiation-curable composite laminate can avoid or minimize some or all of the key limitations of thermally-curing composite laminates (need to often use impractically high temperatures to achieve an acceptable level of cure at an acceptable rate) and moisture-activated curing composite laminates (tendency to cure prematurely upon exposure to the water in which the pipeline is submerged).

Some exemplary embodiments will be described below purely to facilitate the teaching and understanding of the present disclosure. With the help of these examples and other corresponding sections of this disclosure, persons skilled in the art to which the present disclosure pertains can readily imagine many additional embodiments that fall within the scope as taught herein.

A reactive precursor to a composite laminate comprises a glass fabric, a carbon fabric, or a combination(s) thereof; the fabric comprising continuous fibers; wherein a fiber alignment in the fabric may comprise a uniaxial orientation, a biaxial orientation, or any combination(s) thereof; and the fabric can be pre-impregnated with an electron beam curable resin formulation.

Many of the applications where using an electron beam cured composite laminate for strengthening a fluid system component may provide significant commercial opportunities involving fluid system components located in cold environments, such as, but not limited to, deepwater locations and cold (e.g., below freezing) above-ground locations. In this context, a cold environment can be defined to mean an environment where the temperature does not exceed approximately 10° C. (50° F.) during the curing period. Many additional significant commercial opportunities where using an electron beam cured composite laminate for strengthening a fluid system component may provide significant value can, however, also be envisioned in shallow water locations and/or coastal locations that may or may not be cold, and above ground locations that are not cold, i.e., >10° C. (50° F.).

In many embodiments, a reactive precursor is formulated to cure sufficiently rapidly at a very low temperature upon applying an electron beam, while the maximum use temperature of a cured composite laminate does not need to be especially high. As a non-limiting example, a maximum use temperature of 20° C. (68° F.) is sufficient for use in some, a maximum use temperature of 40° C. (104° F.) is sufficient for use in many, a maximum use temperature of 60° C. (140° F.) is sufficient for use in most, and a maximum use temperature of 80° C. (176° F.) is sufficient for use in almost all, of the currently envisioned applications.

Many envisioned applications involve the use of a composite laminate in an environment where it is exposed to (or even submerged entirely in) water. The cured composite laminate of an embodiment targeted for use in such an application must have sufficient water resistance to be able to manifest its targeted maximum use temperature in such an environment.

An exemplary uncured resin formulation may comprise an epoxy, an epoxy acrylate, or a mixture thereof, optimized to cure via electron beam irradiation in an application environment and provide a cured composite laminate possessing a targeted maximum use temperature.

In some embodiments, electron beam irradiation can be used to cure a reactive precursor. D. L. Goodman and G. R. Palmese provide some background information on electron beam irradiation in "Curing and Bonding of Composites Using Electron Beam Processing", in C. Vasile and A. K. Kulshreshtha (editors), Handbook of Polymer Blends and Composites, Volume 1, Shawbury, Rapra Technology Ltd., 2002, pages 459-499, which is hereby incorporated by reference herein in its entirety.

Depending on many variables, such as uncured resin molecular structure, use of ingredients, such as photoinitiators, and/or curing conditions, one or any combination of four types of polymerization chemistries may occur in curing via electron beam irradiation: (1) free radical mechanisms usually dominate in polymerizing acrylic/methacrylic systems; (2) cationic mechanisms aided by photoinitiators usually dominate in polymerizing epoxies; (3) thermal polymerization of a first network under moderate heat exposure followed by electron beam curing of a second network around the first network is typical in the formation of interpenetrating networks; and (4) a reactive precursor mixture comprising two or more types of unreacted resins that cure at very different rates and/or with differing mechanisms under electron beam irradiation may be used to form an interpenetrating network without needing the use of a thermal polymerization step.

A moderate thermal postcure step may be applied after electron beam curing to advance the extent of curing of the thermoset network and/or to enhance fiber-matrix adhesion. In this context, the term "moderate thermal postcure step" is defined as a process step performed after curing a formulation via electron beam irradiation, the step utilizing a lower temperature and/or a shorter duration than would be required to cure the same resin formulation thermally.

A fabric pre-impregnated with an unreacted resin formulation can be rolled up and placed inside a hermetically sealed pouch that is both non-transparent and non-translucent to minimize and/or protect it from curing prematurely as a result of accidental exposure to environmental factors, including but not limited to sunlight; during storage, handling, and transport.

In some embodiments, the fabric is unrolled and wrapped around a circumference of a fluid system component, and the resin formulation is cured to obtain a composite laminate. In some embodiments, the fabric is placed as a patch over a portion of a fluid system component, and the resin formulation is cured to obtain a composite laminate. In some embodiments, the fabric is removed from its packaging and, where applicable, unrolled or unfolded for partitioning into smaller sections for application as a patch or wrap of a component with a smaller periphery.

Curing via electron beam irradiation can be performed in a layer-by-layer manner in many embodiments, as a fabric that has been pre-impregnated with an unreacted resin formulation is either being wrapped around a circumference of or being placed as a patch over a portion of a fluid system component. The scope of this disclosure is not limited by stipulating the use of multiple layers and/or by requiring that the curing be performed one layer at a time. For example, other useful, non-limiting, embodiments can be envisioned where the utilization of two layers or even just a single layer may be sufficient. As another example, yet other useful embodiments can be envisioned where one or two passes of an electron beam irradiation instrument may be sufficient to provide the extent of cure needed for a particular application.

For deepwater repairs, completely automated (robotic) methods can be used, for example, in diverless installations or diver-assisted installations of an uncured composite laminate by using equipment and supplies transported to a repair site via a remotely operated vehicle (ROV). In practical implementations of such methods, another possible role for an ROV (beyond its use in transporting equipment and supplies to a repair site) is for the installation and/or curing of a composite laminate. In any particular field installation, an ROV may be used for transporting equipment and supplies to the repair site, for installing a composite laminate, for the radiation-induced curing of the composite laminate, or any combination(s) thereof.

For coastal or shallow water repairs, the alternatives of (a) using completely automated or semi-automated methods, (b) deploying personnel (for example, one or more divers) to a repair site to install an uncured composite laminate and then use portable electron beam curing equipment, or (c) using a partially automated approach with the help of one or more divers, are all feasible in principle. But, it is possible to make choices between them by considering some general constraints whose implications depend on the circumstances of a specific installation. For instance, the radiation dose absorbed by an electron beam curing system may depend strongly on the distance of the electron gun from the surface of the laminate (unless highly energetic electrons are used, which is usually an undesirable approach because of factors related to increased cost, reduced safety, and potentially lower cured composite laminate quality), its angle, and the speed and detailed mode with which it is being moved. These variables often need to be controlled to within tight tolerances. A. N. Bykanov, D. L. Goodman, C. A. Byrne, L. G. Bykanova, T. W. Pond, L. R. Vorobyev, W. M. McMahon, and M. P. Kovach provide some relevant information in "Automated Tape Placement with In-situ Electron Beam Cure: Process Parameters Optimization", International SAMPE Symposium and Exhibition, 47 (Affordable Materials Technology: Platform to Global Value and Performance, Book 2), pages 902-918, 2002, which is hereby incorporated by reference herein in its entirety, provides examples of the effects of several key parameters on the effectiveness of the curing process. Consequently, even when feasible, the use of a hand-held electron gun by a field technician is a feasible, but perhaps not an optimum approach as it leaves too much room for quality problems caused by technician errors. An additional practical difficulty with the use of a hand-held electron gun by a field technician is that the technician(s) would need to carry portable (but very cumbersome and heavy) concrete blocks or lead slabs with them for shielding to implement such an approach safely. For example, for a low energy (0.15 MeV to 0.3 MeV) electron beam system that can be used to cure a composite laminate layer-by-layer, typical x-ray shielding requirements are the use of a lead slab thickness of approximately 2 to 6 cm or a concrete block thickness of approximately 10 to 30 cm. Because of all of these considerations, even when an installation approach deploying one or more divers is being used, electron beam curing of a composite laminate is oftentimes performed in an automated manner.

For above ground repairs, it is possible to choose between using completely automated methods, deploying personnel to a repair site to install an uncured composite laminate and then use portable radiation curing equipment to cure it, or using a partially automated approach with the help of one or more workers. However, for the same reasons as for coastal or shallow water repairs, also for above ground repairs, even when an installation approach deploying one or more workers is being used, electron beam curing of a composite laminate is usually performed in an automated or semi-automated manner. As a non-limiting example, workers can use a tape wrapping tool to which an electron gun can be attached. In so doing, the field technicians may be in close proximity to the pipe and the tape wrapping operation.

As the applications of portable radiation curing equipment expand, the development of such equipment as well as its customization for more effective use in specific applications are continuing to be pursued actively by instrument manufacturers. COMET AG (with headquarters in Switzerland) and Advanced Electron Beams (with headquarters in Wilmington, Mass., USA) are two non-limiting examples of portable electron beam curing equipment vendors.

Implementations intended for use in different application environments may require different customized instrument configurations. For example, some electron beam emitters that are currently available commercially cannot withstand immersion in water. They must, therefore, be protected from exposure to water during use in underwater application environments. Without limiting the generality of this disclosure, in some exemplary embodiments, an electron beam emitter that is incapable of withstanding immersion in water is placed within a protective enclosure that can be transported to an underwater repair site, for example, via an ROV, and possesses a window or other structure constructed from a material that allows an electron beam to pass therethrough.

Automated tape placement with "in-situ" layer-by-layer, low-energy electron beam curing can be used as a relatively cheap, safe, and reliable approach for the fabrication of large and complex composite parts in a reproducible manner. The typical electron beam energy used in implementations of this approach ranges from approximately 0.15 MeV to 0.3 MeV since there is no need for an electron beam to penetrate to a great depth. A. N. Bykanov, D. L. Goodman, C. A. Byrne, L. G. Bykanova, T. W. Pond, L. R. Vorobyev, W. M. McMahon, and M. P. Kovach provide some relevant information in "Automated Tape Placement with In-situ Electron Beam Cure: Process Parameters Optimization", International SAMPE Symposium and Exhibition, 47 (Affordable Materials Technology: Platform to Global Value and Performance, Book 2), pages 902-918, 2002.

A version of this approach, which is modified to overcome some major practical difficulties encountered in field implementations of electron beam curing for composite laminates of varying shapes and sizes wrapped around or placed as a patch over fluid system components of varying shapes and sizes located in many different types of environments, is used in exemplary embodiments of the present disclosure. For example, different field implementations may need to be performed in environments including, but not limited to, a deep water location, a coastal location, shallow water, or above ground. The repair design may require the circumferential wrapping and curing of different numbers of layers of a pre-impregnated fabric extended to different axial extents beyond the damaged region. The repair design may require the placement of a composite laminate patch and curing of different numbers of layers of a pre-impregnated fabric extended to different extents beyond the damaged region. The repair design may also require doing so on fluid system components of different shapes, diameters, and surface curvatures. Each composite repair system can have its own design. Economic considerations may require the hardware and software utilized in automation (robotics) equipment intended for use in such field implementations to be sufficiently versatile to allow the use of the same equipment for a wide range of such repairs. Such versatility can be accomplished, for example, by having both hardware of sufficient agility to be able to execute the necessary motions precisely under greatly differing circumstances and control software of sufficient sophistication to allow the motions to be programmed and controlled for execution with precision. Such aspects are not expected to arise in factory implementations of electron beam curing for the repeated manufacture of aerospace composite parts of fixed shapes and sizes in a highly controlled environment.

Some exemplary embodiments of the present disclosure may be selected to be manufactured for commercial use in applications where a fabric pre-impregnated with a reactive precursor is wrapped around a fluid system component before being cured into a load-bearing composite laminate. Optionally, these embodiments may be qualified formally for commercial use in high risk applications by being shown to meet the criteria stipulated in the current version of ASME, Repair of Pressure Equipment and Piping, Part 4 (Non-Metallic and Bonded Repairs), Article 4.1, "Non-Metallic Composite Repair Systems: Risk Applications". Some embodiments may be selected to be manufactured for commercial use in applications where a fabric pre-impregnated with a reactive precursor is placed as a patch over a fluid system component before being cured into a load-bearing repair implement. A committee of the American Society of Mechanical Engineers is currently developing a qualification standards document for repairs using composite laminates as patches. These embodiments may be qualified formally by being shown to meet the criteria stipulated in the version of the standard that is in effect as of the date of completion of their development. In this context, the "successful development" of a standards document is defined as the formal approval of the document by the ASME so that it becomes one of the official standards documents published by the ASME.

Description of Representative Samples

A. Exemplary Experimental Work

In some experimental applications, electron beam curing was performed of Cytec's EBECRYL™ 3701 and EBECRYL™ 8808 resin formulations and of pre-impregnated laminates containing these resin formulations, both in a dry environment and under water, at the facilities of E-BEAM Services, Inc., Lebanon, Ohio, USA.

A Dynamitron electron beam particle accelerator, which was originally developed by IBA Industrial (formerly Radiation Dynamics), operated at 150 kW, 4.5 MeV, was used for electron beam curing. Irradiation was performed at a dose rate of approximately 1.1 MR/sec. The distance from the exit of the instrument window to a sample being cured was approximately 50 inches (127 cm). Far West Technology FWT-60 radiachromic dosimeters (heat-sealed in a foil pouch to protect them from water) were used to monitor the radiation dose. A FWT-100 spectrometer was used to measure the dose at a wavelength setting of 510 nm. In curing experiments performed under water, the depth of the water layer was approximately 0.8 cm (0.315 inches).

The resin formulations cured in a dry environment and the resin formulations cured under water were all found to be well-cured as indicated by their high Shore D hardness values (see examples below).

Samples of a hybrid bidirectional fabric (11 ends/inch, 8 picks/inch, 0.030 inch thickness, 16.0 oz/yd$^2$ weight per unit area, black carbon 12 k fiber in warp direction, white E-glass K 18 517 fiber in weft direction) were impregnated with the resin formulations to prepare a pre-impregnated composite laminate (or "prepreg"). In some embodiments, the warp and weft directions of the fabric are perpendicular to each other; one or both of these directions can define a principal axis direction of the fabric. The electron beam curing of both prepregs placed in a dry environment and prepregs placed under water was found to produce composites possessing excellent tensile properties (see examples below).

B. Exemplary Electron Beam Curing of Resin Formulations in Dry Environments and Under Water Environments The purpose of the first experiment was to assess the electron beam curing characteristics of the resins, both in a dry environment and underwater.

The two resin formulations were poured on dry flat steel plates. One of the dry steel plates with the resin formulations on top of it was kept dry while the other dry steel plate with the resin formulations on top of it was then submerged in water. An electron beam was then applied with a 2.5 MR surface dose at 4.5 MeV. A dosimeter placed on the dry steel plate measured 2.8 MR while a dosimeter placed on the underwater steel plate measured 3.1 MR, indicating that submersion in water had amplified the exposure slightly relative to the use of a dry environment. The surface dose dosimeter measured 2.5 MR on the cart conveyor (a dry environment) as expected. It is envisioned that the slightly higher (2.8 MR) reading on the dry steel plate is most likely caused by a combination of the backscattering of electrons when they impinge upon the steel plate and the generation of X-rays when the electrons hit the steel.

The resin temperatures after one pass of electron beam irradiation were 100° F. on the dry plate and 75° F. on the plate submerged in water. The Shore D hardness, measured in accordance with ASTM D2240, "Standard Test Method for Rubber Property—Durometer Hardness", by using a Pencil Style Durometer Model 202 Type D from PTC Metrology, ranged from 68 to 84 (TABLE 1), showing that the resins had been cured successfully.

After applying a second pass of 2.5 MR electron beam irradiation, the resin temperatures were 128° F. on the dry plate and 82° F. on the plate submerged in water. The Shore D hardness (TABLE 2) had not changed significantly as a result of the application of the second pass of irradiation, providing further confirmation that the resins had been well-cured in the first pass. Three measurements were made for each resin cured in each type of environment.

TABLE 1

Shore D hardness values of EBECRYL ™ 3701 and EBECRYL ™ 8808 resin formulations placed on steel plates and cured (in a dry environment and under water) with a single pass of electron beam irradiation.

| EBECRYL ™ 8808 (cured dry) | EBECRYL ™ 3701 (cured dry) | EBECRYL ™ 8808 (cured underwater) | EBECRYL ™ 3701 (cured underwater) |
|---|---|---|---|
| 79 | 79 | 68 | 80 |
| 80 | 84 | 70 | 79 |
| 79 | 79 | 68 | 82 |

TABLE 2

Shore D hardness values of EBECRYL ™ 3701 and EBECRYL ™ 8808 resin formulations placed on steel plates and cured (in a dry environment and under water) with two passes of electron beam irradiation.

| EBECRYL ™ 8808 (cured dry) | EBECRYL ™ 3701 (cured dry) | EBECRYL ™ 8808 (cured underwater) | EBECRYL ™ 3701 (cured underwater) |
|---|---|---|---|
| 68 | 83 | 79 | 85 |
| 72 | 83 | 78 | 85 |
| 72 | 83 | 79 | 85 |

C. Exemplary Electron Beam Curing of Composite Laminates in Dry Environments and Under Water Environments A surface dose of 1.75 MR was selected for use in layer-by-layer composite laminate curing experiments based on the results of the first experiment summarized above. The rationale behind the selection of this surface dose, which is smaller than the surface dose of 2.5 MR that had been used in curing the resins poured on steel plates, was that subsequent passes of electron beam irradiation would deliver additional radiation doses to the lower layers when the layers of the prepreg are placed one at a time and an additional pass of electron beam irradiation is applied as each new layer is placed.

The impregnation of the fabric with the resin formulations was performed with the help of a mild amount of heating (so that the resin temperatures remained below 130° F. as measured by an infrared thermometer) to facilitate impregnation by reducing the resin viscosities.

Two different layer-by-layer electron beam curing trials were performed (curing in a dry environment, curing under water) for prepregs containing each resin formulation (EBECRYL™ 3701, EBECRYL™ 8808), resulting in a total of four "layer-by-layer" trials. Note: the prepregs used in the curing trials in a dry environment were placed under a pan filled slightly with water in an attempt to simulate the radiation doses of samples cured underwater. In order to accomplish layer-by-layer curing, one strip of the impregnated fabric was smoothed against a steel plate and folded over the edges. It was then sent under the electron beam to receive a 1.75 MR surface dose at 4.5 MeV. After this first layer was cured under the electron beam, a second layer was placed over the first layer, and the curing at 1.75 MR was repeated. This step was repeated two more times to achieve a total of four layers. A dosimeter placed on the steel plate underwater measured 2.4 MR and a dosimeter placed under the pan of water on the dry steel plate measured 1.8 MR. Surface doses measured by dosimeters placed during each pass averaged at 1.75 MR.

A final trial using EBECRYL™ 8808 as the resin formulation and four layers of fabric placed all at once and cured all at once via electron beam irradiation was also performed, for comparison with the layer-by-layer curing trials. The surface dose was 2.5 MR during the first pass of electron beam irradiation. A second pass of irradiation at a surface dose 1.75 MR was then performed, to make sure that this 4-layer composite with the layers being cured all together was cured completely. This trial was performed in a dry environment; and furthermore, without a pan of water above the sample, so that the sample was placed directly under the beam.

The results of measurements performed, in the direction parallel to the carbon fibers, in accordance with ASTM D3039, "Standard Test Method for Tensile Properties of Polymer Matrix Composite Materials", by using an ADME TeXpert 2613 Dual Column Universal Testing Machine (10000 lb load cell capacity), are listed in TABLE 3. It is seen that these five electron beam cured 4-layer composites all possess excellent tensile properties.

Upon examining the data shown in Table 3 more closely, the following trends can be discerned: (a) In layer-by layer curing using each resin, curing dry results in a higher Young's modulus, a higher ultimate tensile strength, and a lower ultimate tensile strain than curing under water. (b) In layer-by-layer curing in each type of environment, using EBECRYL™ 3701 as the resin formulation results in a higher Young's modulus and a higher ultimate tensile strength than using EBECRYL™ 8808 in the same type of environment. (c) For the composites using EBECRYL™ 8808 as the resin formulation and being cured dry, curing all four layers together provides enhancements in Young's modulus, ultimate tensile strength, and ultimate tensile strain.

TABLE 3

Results of tensile elongation measurements in a direction parallel to the carbon fibers, for electron beam cured 4-layer composite laminates where a hybrid bidirectional fabric woven by using a carbon fiber in one direction and a glass fiber in the other direction was impregnated with the indicated Cytec resin formulation and then cured either while being kept in a dry location or under water.

| Resin Formulation | How Curing Was Done | Young's Modulus, msi | Ultimate Tensile Strength, psi | Ultimate Tensile Strain,% |
|---|---|---|---|---|
| EBECRYL ™ 8808 | dry, layer-by-layer | 3.026 ± 0.726 | 55304 ± 2560 | 1.246 ± 0.22 |
| EBECRYL ™ 8808 | underwater, layer-by-layer | 2.687 ± 1.19 | 50429 ± 3085 | 2.56 ± 1.42 |

TABLE 3-continued

Results of tensile elongation measurements in a direction parallel to the carbon fibers, for electron beam cured 4-layer composite laminates where a hybrid bidirectional fabric woven by using a carbon fiber in one direction and a glass fiber in the other direction was impregnated with the indicated Cytec resin formulation and then cured either while being kept in a dry location or under water.

| Resin Formulation | How Curing Was Done | Young's Modulus, msi | Ultimate Tensile Strength, psi | Ultimate Tensile Strain,% |
|---|---|---|---|---|
| EBECRYL ™ 8808 | dry, all layers cured together | 3.412 ± 1.84 | 59043 ± 2206 | 1.56 ± 0.46 |
| EBECRYL ™ 3701 | dry, layer-by-layer | 4.903 ± 0.762 | 69962 ± 4966 | 1.42 ± 0.49 |
| EBECRYL ™ 3701 | underwater, layer-by-layer | 4.133 ± 2.172 | 58718 ± 4650 | 1.59 ± 0.33 |

Additional Features, Alternatives, and Embodiments

Presented hereinbelow are an array of additional and optional embodiments and variations that fall within the scope and spirit of the present disclosure. The variants discussed hereinafter are not intended to represent every embodiment, or every aspect, of the present invention, and should therefore not be construed as limitations. Further, the following variants and embodiments may be used in any combination or subcombination not logically prohibited. By way of example, the following variants are described with respect to methods, kits, and alternatives thereof; nevertheless, the following features may be similarly applicable to any of the disclosed system embodiments, method embodiments, and kit embodiments of the present invention.

One embodiment may be directed to a method, or kits including composite repair materials and equipment for implementing the method, for strengthening a fluid system component by installing a composite repair system, the method comprising: (a) transporting to the location of the fluid system component a fabric constructed from a continuous reinforcing fiber, wherein the fabric is pre-impregnated with a reactive precursor; (b) unrolling the fabric and wrapping it around the fluid system component; and (c) applying radiation to cure the reactive precursor to obtain a load-bearing composite laminate comprising the fabric in a thermoset polymer matrix.

One embodiment may be directed to a method, or kits including composite repair materials and equipment for implementing the method, for strengthening a fluid system component by installing a composite repair system, the method comprising: (a) transporting to the location of the fluid system component a fabric constructed from a continuous reinforcing fiber, wherein the fabric is pre-impregnated with a reactive precursor; (b) unrolling the fabric and placing it as a patch over a portion of the fluid system component; and (c) applying radiation to cure the reactive precursor to obtain a load-bearing composite laminate comprising the fabric in a thermoset polymer matrix.

The reactive precursor may comprise an epoxy, an epoxy acrylate, an imide, a bismaleimide, an acrylate, a urethane, a urethane acrylate, a urea, an unsaturated ester, a vinyl ester, a cyanate ester, a phenolic, or any mixture(s) or combination(s) thereof.

The reactive precursor may comprise an epoxy, an epoxy acrylate, or any mixture(s) or combination(s) thereof.

The reactive precursor may comprise an additional ingredient selected from the group consisting of an impact modifier, a fire retardant, an antioxidant, a photoinitiator, a catalyst, an inhibitor, a buffer, a dispersant, a surfactant, a stabilizer, a compatibilizer, a rheology modifier, a defoamer, or any combination(s) thereof.

The fiber may be selected from the group consisting of a glass fiber, a carbon fiber, a basalt fiber, an aramid fiber, a polyolefin fiber, a synthetic polymer fiber, a fiber obtained or derived from a plant product, a fiber obtained or derived from an animal product, or any combination(s) thereof.

The fiber may be selected from the group consisting of a glass fiber, a carbon fiber, or any combination(s) thereof.

The fabric may comprise fibers arranged in a uniaxial orientation, a biaxial orientation, or any combination(s) thereof.

The radiation may be selected from the group consisting of microwaves, ultraviolet rays, an electron beam, x-rays, gamma-rays, or any combination(s) thereof.

The radiation may comprise or consist essentially of an electron beam.

The electron beam may possess an energy ranging from 0.15 MeV to 0.3 MeV.

Automated tape placement with "in-situ" layer-by-layer curing may be used for applying the composite laminate.

The automated tape placement method can be modified to overcome a technical challenge involved in a field installation of a composite repair system.

A step of curing by applying radiation can be followed by a step of thermal postcuring.

The step of thermal postcuring can be performed at a lower temperature than, for a shorter duration than, or both at a lower temperature and for a shorter duration than, would be needed to achieve a similar extent of cure via thermal curing.

The fluid system component may comprise pipework, a pipeline, a transmission pipeline, a distribution pipeline, a gathering line, an oil riser, a gas riser, process piping, a girth weld on a pipeline, a tank, a vessel, a girth weld on a vessel, an elbow, a tee, a flange, a high-pressure injection line, or any combination(s) thereof.

The material of construction used in the fluid system component may comprise carbon steel, low and high alloy-steel, stainless steel, aluminum, titanium, polyethylene, poly(vinyl chloride) (PVC), acrylonitrile-butadiene-styrene (ABS) copolymers, fiber-reinforced polymers, concrete, or any combination(s) thereof.

Strengthening may comprise a repair, a structural reinforcement, or any combination(s) thereof.

The location of repair may be in deep water, in shallow water, coastal, or above ground.

In some embodiments, the temperature of the location that the method is implemented and/or the curing takes place does not exceed approximately 10° C. (50° F.).

In some embodiments, the temperature of the location that the method is implemented and/or the curing takes place exceeds 10° C. (50° F.).

In some embodiments, automated or semi-automated means are used for implementing the method. In some embodiments, personnel deployed to the location are used for implementing the method. In some embodiments, automated or semi-automated means are used in conjunction with deployed personnel for implementing the method A remotely operated vehicle (ROV) can be used for transporting equipment and supplies to the location, for installing the composite laminate, for the radiation-induced curing of the composite laminate, or any combination(s) thereof.

In some embodiments, the maximum use temperature of the composite repair system is at least 20° C. (68° F.).

In some embodiments, the maximum use temperature of the composite repair system is at least 40° C. (104° F.).

In some embodiments, the maximum use temperature of the composite repair system is at least 60° C. (140° F.).

In some embodiments, the maximum use temperature of the composite repair system is at least 80° C. (176° F.).

In some embodiments, the maximum use temperature is attained while the composite repair system is submerged in water.

The composite repair system can be qualified formally for commercial use in high risk applications by being shown to meet the criteria stipulated in the version of American Society of Mechanical Engineers (ASME), Repair of Pressure Equipment and Piping, Part 4 (Non-Metallic and Bonded Repairs), Article 4.1, "Non-Metallic Composite Repair Systems: High Risk Applications" that is in effect as of the date of completion of the development of the composite repair system.

The composite repair system can be qualified formally for commercial use by being shown to meet the criteria stipulated in the version of an American Society of Mechanical Engineers (ASME) qualification standards document for repairs using composite laminates as patches, under preparation as of the date of this filing, that is in effect as of the date of completion of the development of the composite repair system.

While exemplary embodiments and applications of the present disclosure have been illustrated and described, it is to be understood that the invention is not limited to the precise construction and compositions disclosed herein and that various modifications, changes, and variations can be apparent from the foregoing descriptions without departing from the spirit and scope of the invention as defined by the appended claims.

The invention claimed is:

1. A method for strengthening a component in a fluid system, the method comprising:
providing a composite laminate with a fabric carrier including a continuous reinforcing fiber, the fabric carrier being pre-impregnated with a reactive precursor chemically configured to activate upon exposure to artificial radiation, wherein the artificial radiation is selected from the group consisting of microwaves, an electron beam, x-rays, gamma-rays, or any combination thereof;
providing an automated wrapping device configured to automatically apply the composite laminate on a layer-by-layer basis to the fluid-system component at a water depth between 1 foot and 20,000 feet;
placing the composite laminate over a portion of the fluid-system component at a water depth between 1 foot and 20,000 feet via the automated wrapping device; and
applying the artificial radiation to the fabric carrier at a water depth between 1 foot and 20,000 feet such that the reactive precursor is cured thereby creating a load-bearing repair implement from the composite laminate.

2. The method of claim 1, further comprising transporting the composite laminate and a device for the applying of artificial radiation to the fabric carrier to a deep-sea location via a remotely operated vehicle (ROV).

3. The method of claim 2, wherein the placing the composite laminate and the applying artificial radiation to the fabric carrier is carried out via the ROV.

4. The method of claim 1, wherein the reactive precursor comprises an epoxy, an acrylate, a urethane, or any mixture or combinations thereof.

5. The method of claim 1, wherein the artificial radiation is generated by an electron beam, the electron beam possessing an energy ranging from approximately 0.15 to 0.30 megaelectron volts (MeV).

6. The method of claim 1, further comprising thermal post-curing the composite laminate subsequent to the applying of artificial radiation to the fabric carrier.

7. The method of claim 1, wherein the material of the fluid-system component comprises steel, concrete, or a combination thereof.

8. The method of claim 1, wherein the reactive precursor is further chemically configured to activate at water depths of approximately 1 to 20,000 feet.

9. The method of claim 1, wherein the maximum use temperature of the composite laminate is approximately 68 to 176° F.

10. The method of claim 1, wherein the load-bearing repair implement formed from the composite laminate exhibits a tensile strength of approximately 15,000 to 150,000 psi in at least one principal axis direction and an impact resistance of at least approximately 80 joules.

11. The method of claim 1, wherein the load-bearing repair implement formed from the composite laminate exhibits a tensile strength of at least approximately 2,500 psi in at least one principal axis direction.

12. The method of claim 1, wherein the load-bearing repair implement formed from the composite laminate exhibits a tensile strength of at least approximately 15,000 psi in both principal axis directions.

13. The method of claim 1, wherein the load-bearing repair implement formed from the composite laminate exhibits a tensile strength of at least approximately 50,000 psi in at least one principal axis direction.

14. The method of claim 4, wherein the reactive precursor further comprises an additional ingredient including a photoinitiator, a catalyst, a stabilizer, or any mixture or combinations thereof.

15. The method of claim 1, wherein the fluid system component comprises pipework, a pipeline, or any combination thereof.

16. The method of claim 1, wherein the continuous reinforcing fiber is selected from the group consisting of a glass fiber, a carbon fiber, or any combination thereof.

17. The method of claim 1, wherein the reinforcing fiber is arranged in a uniaxial orientation, a biaxial orientation, or a combination thereof.

18. The method of claim 1, wherein the reactive precursor is further chemically configured to activate under a water pressure of approximately 2.2 to 4,400 pounds per square inch (psi).

19. The method of claim 1, wherein the reactive precursor is further chemically configured to activate at temperatures of approximately 5° F. and higher.

20. The method of claim 1, wherein the reactive precursor is further chemically configured to activate at temperatures ranging from approximately 0 to 75° F.

21. A method for strengthening a component in a fluid system, the method comprising:
- providing a composite laminate with a fabric carrier including a continuous reinforcing fiber, the fabric carrier being pre-impregnated with a reactive precursor chemically configured to activate upon exposure to artificial radiation, wherein the artificial radiation is selected from the group consisting of microwaves, an electron beam, x-rays, gamma-rays, or any combination thereof;
- providing an automated wrapping device configured to automatically apply the composite laminate on a layer-by-layer basis to the fluid-system component;
- placing the composite laminate over a portion of the fluid-system component via the automated wrapping device in an environment with a temperature below approximately 50° F.; and
- applying the artificial radiation to the fabric carrier in the environment with the temperature below approximately 50° F. such that the reactive precursor is cured thereby creating a load-bearing repair implement from the composite laminate.

* * * * *